(12) United States Patent
Kirt et al.

(10) Patent No.: US 9,103,319 B2
(45) Date of Patent: Aug. 11, 2015

(54) WIND TURBINE GENERATOR SERVICE BY AIRSHIP

(75) Inventors: Rune Kirt, Copenhagen East (DK); Mads Bækgaard Thomsen, Copenhagen N (DK); Duncan Galbraith, Argyll (GB)

(73) Assignee: Vestas Wind Systems A/S, Aarhus N. (DK)

( * ) Notice: Subject to any disclaimer, the term of this patent is extended or adjusted under 35 U.S.C. 154(b) by 739 days.

(21) Appl. No.: 13/377,382

(22) PCT Filed: Jun. 15, 2010

(86) PCT No.: PCT/DK2010/050143
§ 371 (c)(1),
(2), (4) Date: Dec. 9, 2011

(87) PCT Pub. No.: WO2010/145666
PCT Pub. Date: Dec. 23, 2010

(65) Prior Publication Data
US 2012/0085864 A1     Apr. 12, 2012

Related U.S. Application Data

(60) Provisional application No. 61/187,065, filed on Jun. 15, 2009.

(30) Foreign Application Priority Data

Jun. 30, 2009   (EP) ..................................... 09164257

(51) Int. Cl.
*B64B 1/06*     (2006.01)
*B64D 1/22*     (2006.01)
(Continued)

(52) U.S. Cl.
CPC . *F03D 1/001* (2013.01); *B64B 1/06* (2013.01); *B64B 1/30* (2013.01); *B64B 1/66* (2013.01);
(Continued)

(58) Field of Classification Search
CPC .............. B64B 1/06; B64B 1/66; B64D 1/22; B64F 1/12; B64F 1/14; E04H 12/34
USPC .............. 244/30, 31, 127, 137.4, 172.4, 172.5
See application file for complete search history.

(56) References Cited

U.S. PATENT DOCUMENTS 3,393,769 A * 7/1968 Springer .................... 244/137.2
3,863,736 A * 2/1975 McWilliams .............. 244/137.1
(Continued)

FOREIGN PATENT DOCUMENTS

DE   29720711 U1   1/1998
DE   10252911 A1   5/2004
(Continued)

OTHER PUBLICATIONS

European Patent Office, International Search Report and Written Opinion issued in related International application No. PCT/DK2010/050143 dated Sep. 20, 2010.
(Continued)

*Primary Examiner* — Tien Dinh
*Assistant Examiner* — Richard R Green
(74) *Attorney, Agent, or Firm* — Wood, Herron & Evans, LLP

(57) ABSTRACT

The invention relates to a method for positioning an airship 100 at a wind turbine generator. The method comprises the step of docking the airship 100 at the wind turbine generator with a forwards docking section, a rearwards docking section, a sideways docking section, or an upwards docking section of the airship being connected to the wind turbine generator. After the airship 100 has docked, at least one wind turbine generator component or at least one person is unloaded from the airship or loaded from the wind turbine generator to the airship. Docking of the airship 100 may be performed at one of the following components of the wind turbine generator: the nacelle 116, the hub 118, the tower, one or more of the blades 120, the foundation, or a substation of the wind turbine generator. The invention also relates to use of an airship 100 for being connected to a wind turbine generator and for loading or unloading wind turbine generator components or personnel to or from the wind turbine generator.

19 Claims, 10 Drawing Sheets

(51) Int. Cl.
*B64F 1/12* (2006.01)
*B64F 1/14* (2006.01)
*F03D 1/00* (2006.01)
*B64B 1/30* (2006.01)
*B64B 1/66* (2006.01)

(52) U.S. Cl.
CPC ... *B64F 1/12* (2013.01); *B64F 1/14* (2013.01); *F03D 1/003* (2013.01); *B64D 1/22* (2013.01); *F05B 2230/604* (2013.01); *F05B 2230/61* (2013.01); *F05B 2230/80* (2013.01); *Y02E 10/728* (2013.01)

(56) References Cited

U.S. PATENT DOCUMENTS

| | | | | |
|---|---|---|---|---|
| 4,009,850 | A | * | 3/1977 | Hickey .......................... 244/115 |
| 4,470,563 | A | * | 9/1984 | Engelsman ..................... 244/33 |
| 4,491,739 | A | * | 1/1985 | Watson .......................... 290/44 |
| 5,096,141 | A | * | 3/1992 | Schley .......................... 244/127 |
| 6,231,007 | B1 | * | 5/2001 | Schafer ......................... 244/127 |
| 2006/0175465 | A1 | * | 8/2006 | Teichert ......................... 244/33 |
| 2007/0102571 | A1 | * | 5/2007 | Colting .......................... 244/30 |
| 2011/0057158 | A1 | * | 3/2011 | Von Kessel et al. .......... 254/323 |

FOREIGN PATENT DOCUMENTS

| | | | |
|---|---|---|---|
| EP | 1134410 | A1 | 9/2001 |
| GB | 108057 | A | 7/1917 |
| GB | 2055728 | A | 3/1981 |
| WO | 2005031159 | A1 | 4/2005 |
| WO | 2006010783 | A1 | 2/2006 |
| WO | WO 2009/033853 | * | 3/2009 .................... 244/323 |

OTHER PUBLICATIONS

European Patent Office, Search Report issued in related European Application No. EP 09 16 4257 dated Jan. 18, 2010.

The International Bureau of WIPO, Notification Concerning Transmittal of International Preliminary Report on Patenbtability (Chapter I of the Patent Cooperation Treaty); PCT/DK2010/050143; Jun. 15, 2010; 7 pgs.

* cited by examiner

WIND TURBINE GENERATOR SERVICE BY AIRSHIP

FIELD OF THE INVENTION

The invention relates to a method for handling pieces of equipment for installing, servicing and maintenance of a wind turbine generator, and in particular to a method for handling one or more wind turbine generator components or one more persons. The invention also relates to an airship, to a wind turbine generator and to use of such airship and such wind turbine generator.

BACKGROUND OF THE INVENTION

The inventor of the present invention has appreciated that an improved method of handling pieces of equipment for installing, servicing and maintenance of a wind turbine generator is of benefit, and has in consequence devised the present invention.

Installing, servicing and maintenance of a wind turbine generator comprise different pieces of equipment and different steps of transportation. The pieces of equipment can be wind turbine generator components themselves including sub stations for supplying the electrical energy to a grid, or the pieces of equipment can be equipment associated with installing, servicing and maintenance of a wind turbine generator such as mobile cranes or other installation equipment needed at a site of installation or at another site.

Cranes are widely used for installation, servicing and maintenance of wind turbine generators, either land-based mobile cranes or stationary cranes, or sea-based barge cranes, or even air-borne helicopters used as cranes. Vehicles and vessels are also used for installation of wind turbine generators, including trucks, trains, ships and aircrafts, namely for transporting pieces of equipment from a site of loading to a site of unloading.

Common to the different vessels and vehicles used for installation, servicing and maintenance of a wind turbine generator is that the vessels or vehicles often are very expensive to use and/or require roads, harbours, airports, or railway stations for loading and unloading the pieces of equipment and/or require sufficiently widespread and stabile roads or railways between the site of loading and the site of unloading.

SUMMARY OF THE INVENTION

It may be seen as an object of the present invention to provide an improved method for handling wind turbine generator components or personnel, in particular in relation to servicing and maintenance of a wind turbine generator during use.

It may furthermore be seen as an object of embodiments of the present invention to provide an improved method for handling wind turbine generator components or personnel in the last period of the installation of a wind turbine generator.

The objects and advantages of the invention may be obtained by a method for positioning an airship at a wind turbine generator, said method comprising the steps of:
 docking the airship at the wind turbine generator with a forwards docking section, a rearwards docking section, a sideways docking section, or an upwards docking section of the airship being connected to the wind turbine generator, and
 subsequently unloading to the wind turbine generator from the airship or loading from the wind turbine generator to the airship at least one wind turbine generator component or at least one person.

Docking the airship at the wind turbine generator may have the advantage of the airship obtaining contact with the wind turbine generator without being limited by the surface at the ground or the sea at which the wind turbine generator is installed, such as large rocks on the ground or large waves at high sea.

Unloading to the wind turbine generator from the airship or loading from the wind turbine generator to the airship one or more wind turbine generator components or persons may be an advantage during service of the wind turbine generator.

According to a possible aspect of the invention, docking the airship at the wind turbine generator is performed at one of the following components of the wind turbine generator: the nacelle, the hub, the tower, one or more of the blades, the foundation, or a substation of the wind turbine generator.

Docking the airship at any one of the major components of the wind turbine generator may be possible depending on the accessibility for the airship at the wind turbine generator and depending on the size and configuration of the airship.

According to a possible aspect of the invention, unloading from the airship to the wind turbine generator or loading from the wind turbine generator to the airship is performed from a top of the nacelle, possibly through a hatch in the top of a nacelle fuselage.

Unloading from the airship to the wind turbine generator or loading from the wind turbine generator to the airship at a top of the nacelle, possibly through a hatch in the top of a nacelle fuselage may be an advantage in relation to a good, safe and sufficient accessibility for the airship to the wind turbine generator.

According to a possible aspect of the invention, unloading from the airship to the wind turbine generator or loading from the wind turbine generator to the airship is performed by a hoist of the airship hoisting the at least one wind turbine generator component or the at least one person up or down from or to the wind turbine generator.

Hoisting one or more wind turbine generator components or persons up or down from or to the wind turbine generator may be an advantage if docking the airship to the wind turbine generator cannot be performed by another means such as a jetty or a ladder, e.g. docking being performed by a rope, wire or a chain.

According to a possible aspect of the invention, unloading from the airship to the wind turbine generator or loading from the wind turbine generator to the airship is performed by an on-board crane of the airship hoisting the at least one wind turbine generator component or the at least one person up or down from or to the wind turbine generator.

Hoisting one or more wind turbine generator components or persons up or down from or to the wind turbine generator by an on-board crane of the airship may be an advantage to ensure that unloading from and loading to the wind turbine generator may be performed, independent of any hoisting equipment or other unloading and loading equipment at the site of the wind turbine generator.

According to a possible aspect of the invention, unloading from the airship to the wind turbine generator or loading from the wind turbine generator to the airship is performed from a jetty leading the at least one wind turbine generator component or the at least one person to or from the wind turbine generator.

Unloading from or loading to wind turbine generator by using a jetty may be an advantage for docking the airship to the wind turbine generator with means providing safe and easy access to the wind turbine generator, instead of docking being performed by e.g. a rope, wire or a chain possibly making access difficult.

According to a possible aspect of the invention, unloading from the airship to the wind turbine generator or loading from the wind turbine generator to the airship is performed along a ladder leading the at least one wind turbine generator component or the at least one person to or from the wind turbine generator.

Unloading from or loading to wind turbine generator by using a ladder may be an advantage for docking the airship to the wind turbine generator with means providing safe and easy access to the wind turbine generator, instead of docking being performed by e.g. a rope, wire or a chain possibly making access difficult.

The objects and advantages of the invention may also be obtained by an airship for handling wind turbine generator components, said airship being provided with an anchoring element of a connection mechanism, said anchoring element of the connection mechanism being intended for cooperating with a docking element of the connection mechanism via a connection element, said docking element of the connection mechanism being part of a wind turbine generator.

An airship being provided with an anchoring element of a connection mechanism and intended for cooperating with a docking element being part of a wind turbine generator may have the advantage of the airship safely and easily docking at the wind turbine generator with mutual connection adapted for such docking.

According to a possible aspect of the invention, said docking element of the connection mechanism is or is attached to one of the following components of the wind turbine generator: a nacelle, a hub, a tower, one or more blades, a foundation or a substation of the wind turbine generator.

Docking the airship at any one of the major components of the wind turbine generator may be possible depending on the accessibility for the airship at the wind turbine generator and depending on the size and configuration of the airship. Accessibility is enhanced when being performed by a connection mechanism.

According to a possible aspect of the invention, the anchoring element of the connection mechanism is a male part or a female part of the connection mechanism, said male part or female part of the connection mechanism intended for cooperating with a corresponding female part or male part, respectively, of the wind turbine generator.

An airship being provided with a male or female part of a connection mechanism and intended for cooperating with a female or male part, respectively, being part of a wind turbine generator may have the advantage of the airship safely and easily docking at the wind turbine generator with mutual connection adapted for such docking.

According to a possible aspect of the invention, the anchoring element of the connection mechanism is a jetty extending from a forwards docking section, a rearwards docking section, or a sideways docking section of the airship.

A jetty of the airship constituting the connection element of the connection mechanism may be an advantage for docking the airship to the wind turbine generator with means providing safe and easy access to the wind turbine generator, instead of docking being performed by e.g. a rope, wire or a chain possibly making access difficult.

According to a possible aspect of the invention, the connection element of the connection mechanism is a ladder extending from a forwards docking section, a rearwards docking section, or a sideways docking section of the airship.

A ladder of the airship constituting the connection element of the connection mechanism may be an advantage for docking the airship to the wind turbine generator with means providing safe and easy access to the wind turbine generator, instead of docking being performed by e.g. a rope, wire or a chain possibly making access difficult.

According to a possible aspect of the invention, the connection element of the connection mechanism is a crane extending from a forwards docking section, a rearwards docking section, or a sideways docking section of the airship.

A crane of the airship constituting the connection element of the connection mechanism may be an advantage to ensure that unloading from and loading to the wind turbine generator may be performed, non-dependent of any hoisting equipment or other unloading and loading equipment at the site of the wind turbine generator.

The objects and advantages of the invention may also be obtained by a wind turbine generator being provided with a docking element of a connection mechanism, said docking element of the connection mechanism intended for cooperating with an anchoring element of the connection mechanism, said anchoring element of the connection mechanism being part of an airship.

A wind turbine generator being provided with a docking element of a connection mechanism and intended for cooperating with a first part being part of an airship may have the advantage of the airship safely and easily docking at the wind turbine generator with mutual connection adapted for such docking.

According to a possible aspect of the invention, the docking element of the connection mechanism is a male part or a female part of the connection mechanism, said male part or female part of the connection mechanism intended for cooperating with a corresponding female part or male part, respectively, of the airship.

A wind turbine generator being provided with a male or female part of a connection mechanism and intended for cooperating with a female or male part, respectively, being part of an airship may have the advantage of the airship safely and easily docking at the wind turbine generator with mutual connection adapted for such docking.

According to a possible aspect of the invention, the connection element of the connection mechanism is a jetty extending from one of the flowing parts of the wind turbine generator: a nacelle, a hub, a tower, one or more blades, a foundation or a substation of the wind turbine generator.

A jetty of the wind turbine generator constituting the connection element of the connection mechanism may be an advantage for docking the airship to the wind turbine generator with means providing safe and easy access to the wind turbine generator, instead of docking being performed by e.g. a rope, wire or a chain possibly making access difficult.

According to a possible aspect of the invention, the connection element of the connection mechanism is a ladder extending from one of the flowing parts of the wind turbine generator: a nacelle, a hub, a tower, one or more blades, a foundation or a substation of the wind turbine generator.

A ladder of the wind turbine generator constituting the connection element of the connection mechanism may be an advantage for docking the airship to the wind turbine generator with means providing safe and easy access to the wind turbine generator, instead of docking being performed by e.g. a rope, wire or a chain possibly making access difficult.

According to a possible aspect of the invention, the connection element of the connection mechanism is a crane extending from one of the flowing parts of the wind turbine generator: a nacelle, a hub, a tower, one or more blades, a foundation or a substation of the wind turbine generator.

A crane of one of the major parts of the wind turbine generator and constituting the connection element of the connection mechanism may be an advantage to ensure that unloading from and loading to the wind turbine generator may be performed, non-dependent of any hoisting equipment or other unloading and loading equipment of the airship.

The objects and advantages of the invention may also be obtained by use of an airship for connecting to a wind turbine generator and for loading or unloading wind turbine generator components or personnel to or from the wind turbine generator, said airship being provided with an anchoring element of a connection mechanism, said anchoring element of the connection mechanism intended for cooperating with a second part of the connection mechanism, said second part of the connection mechanism being part of a wind turbine generator.

The objects and advantages of the invention may also be obtained by use of a wind turbine generator for connecting to an airship and for loading or unloading wind turbine generator components or personnel to or from the airship, said wind turbine generator being provided with a docking element of a connection mechanism, said docking element of the connection mechanism intended for cooperating with an anchoring element of the connection mechanism, said anchoring element of the connection mechanism being part of an airship.

The objects and advantages of the invention may also be obtained by use of an airship for connecting to a wind turbine tower and for accommodating wind turbine generator components or personnel overnight, before the wind turbine generator components or personnel being loaded or unloaded to or from the nacelle, said airship being provided with an anchoring element of a connection mechanism, said anchoring element of the connection mechanism intended for cooperating with a docking element of the connection mechanism, said second part of the connection mechanism being part of a wind turbine generator.

Different applications and uses in accordance with the present invention include:
  airship refueling from the wind turbine generator in which the airship may preferably be refueled or recharged electrically (e.g., an electrically driven airship may have its batteries recharged directly from the electricity generating wind turbine) e.g. while the airship is docked at the wind turbine generator for unloading or loading at least one wind turbine generator component or at least one person;
  an airship functioning as a rescue vehicle during maintenance and service, being able to rescue personnel possibly trapped on top of the wind turbine generator, e.g. at the nacelle, at the hub or at the blades;
  providing an airship with a module or an attachment which enables it to maintain, clean or change a blade;
  using an airship to exchange of main components, which might accelerate a service cycle;
  using an airship for stocking service delivery and installation where the nacelle components go to a large shared stock onshore and a service airship goes back and forth 24 hours every day between the wind turbine generators and the stock and transports the components;
  using an airship for easy access to offshore wind turbine generators for maintenance;
  using an airship for nacelle repair where an airship fitted with a crane is used to repair and change parts in wind turbine generators; using an airship to change blades on wind turbine generators;
  using an airship to replace components of a wind turbine generator offshore;
  using an airship for cleaning one or more blades of a wind turbine generator;
  using an airship for rapidly performing service, an advantage of this being that it is better and faster than a crane;
  using an airship as a platform for service staff offshore.

When referring to an advantage, it must be understood that this advantage may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

Airships for performing one or more of the methods according to the invention may be specifically developed for performing the one or more methods.

However, hereby incorporated by reference are already developed, existing or projected airships from one or more of the following developers and manufactures of airships: Skycat/Hybrid Air Vehicles, Skyhook International, Lockheed Martin, RosAeroSystems, 21st Centry Airships, Airship.org, all of which are suited for performing one or more of the methods according to the invention.

These and other aspects, features and/or advantages of the invention will be apparent from and elucidated with reference to the description hereinafter.

DETAILED DESCRIPTION OF EMBODIMENTS

Figure 1:
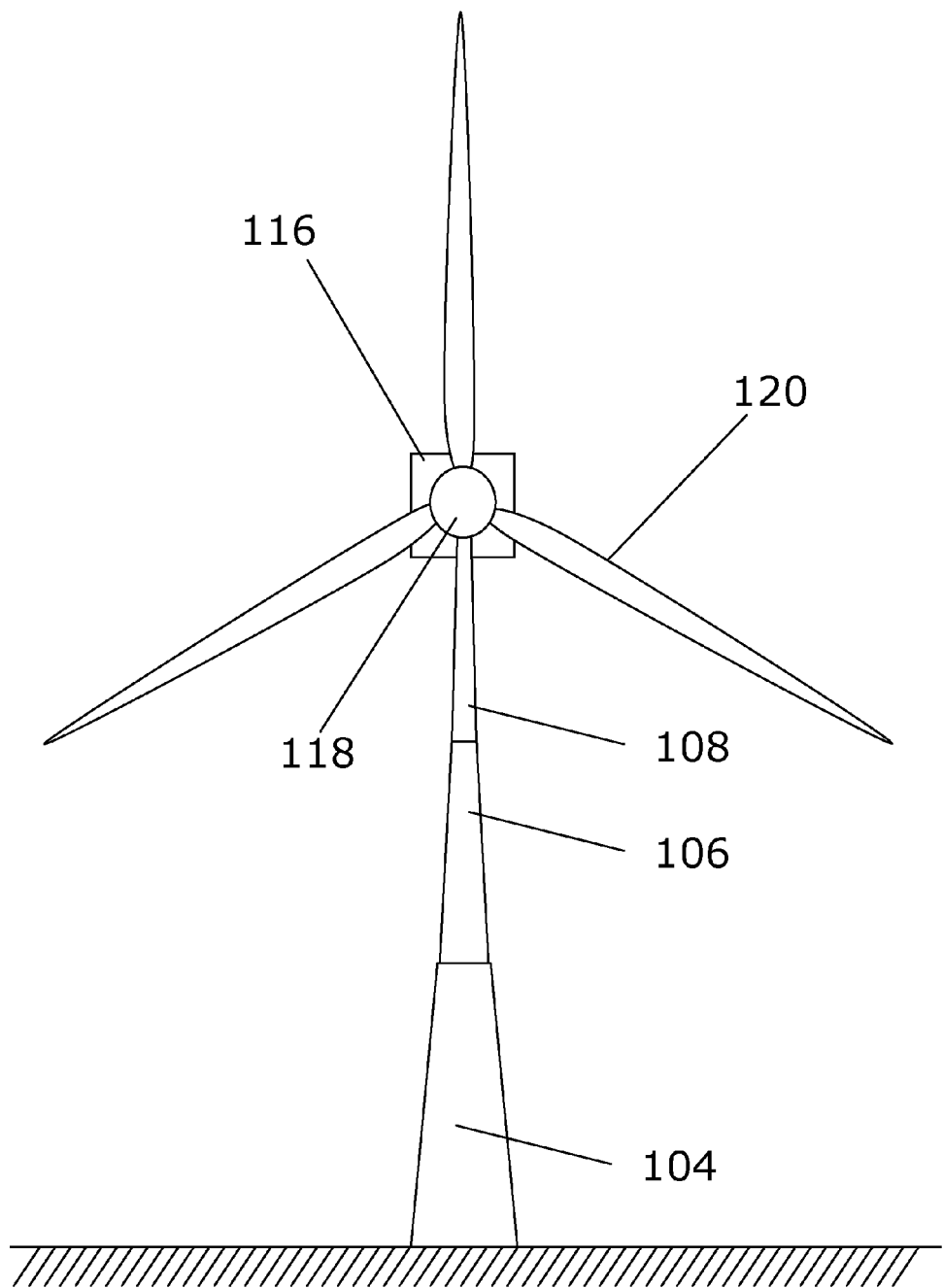
FIGS. 1-2 show a front and a side view, respectively, of a wind turbine comprising three wind tower sections.
Figure 2:
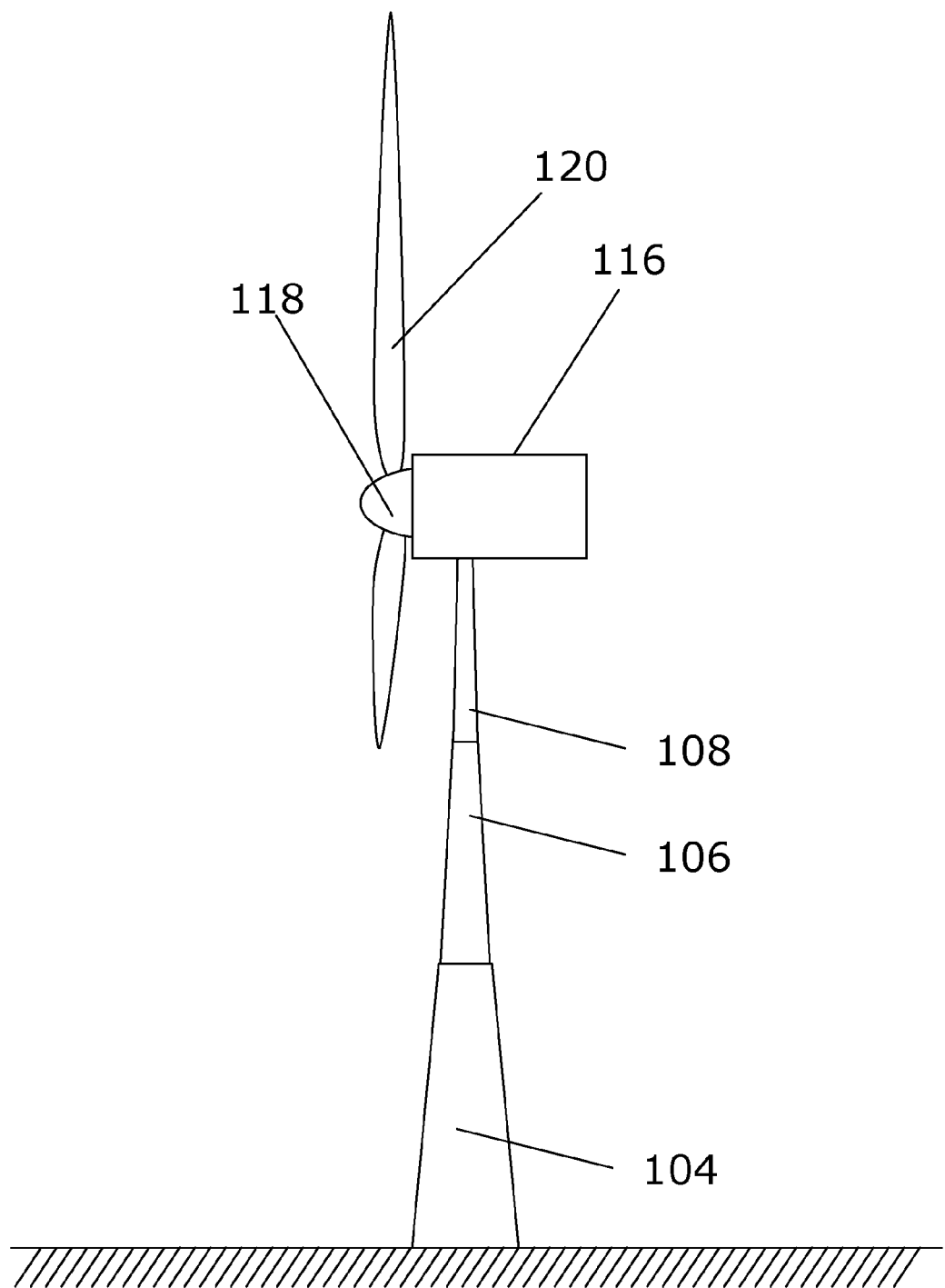

FIGS. 1 and 2 show a front view and a side view, respectively, of a wind turbine generator comprising three wind tower sections 104, 106 and 108, a nacelle 116, a hub 118 and three blades 120. Other types of wind turbine generators may also be envisaged.

Figure 3:
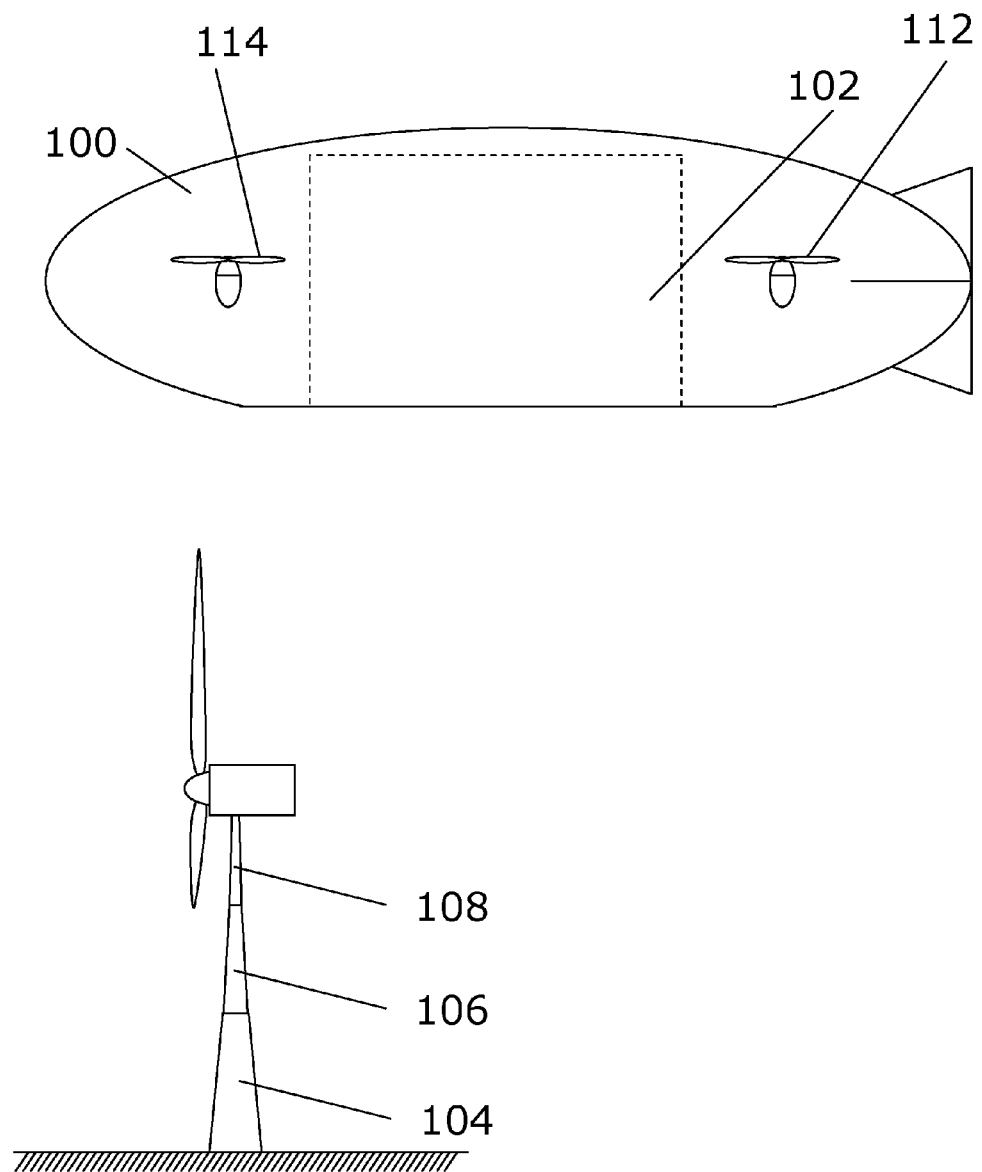
FIG. 3 schematically shows an airship flying over a wind turbine.

FIG. 3 shows an airship 100 flying over a wind turbine. The airship comprises propellers 114, 112 and a cavity 102. The airship 100 is positioned in a direction perpendicular to the rotational axis of the blades allowing it to dock between two blades of the wind turbine with the blades extending on each side of the airship 100, or allowing the airship 100 to dock with one blade extending into the cavity 102, or possibly allowing the airship 100 to dock with two blades extending into the cavity 102.

Figure 4:
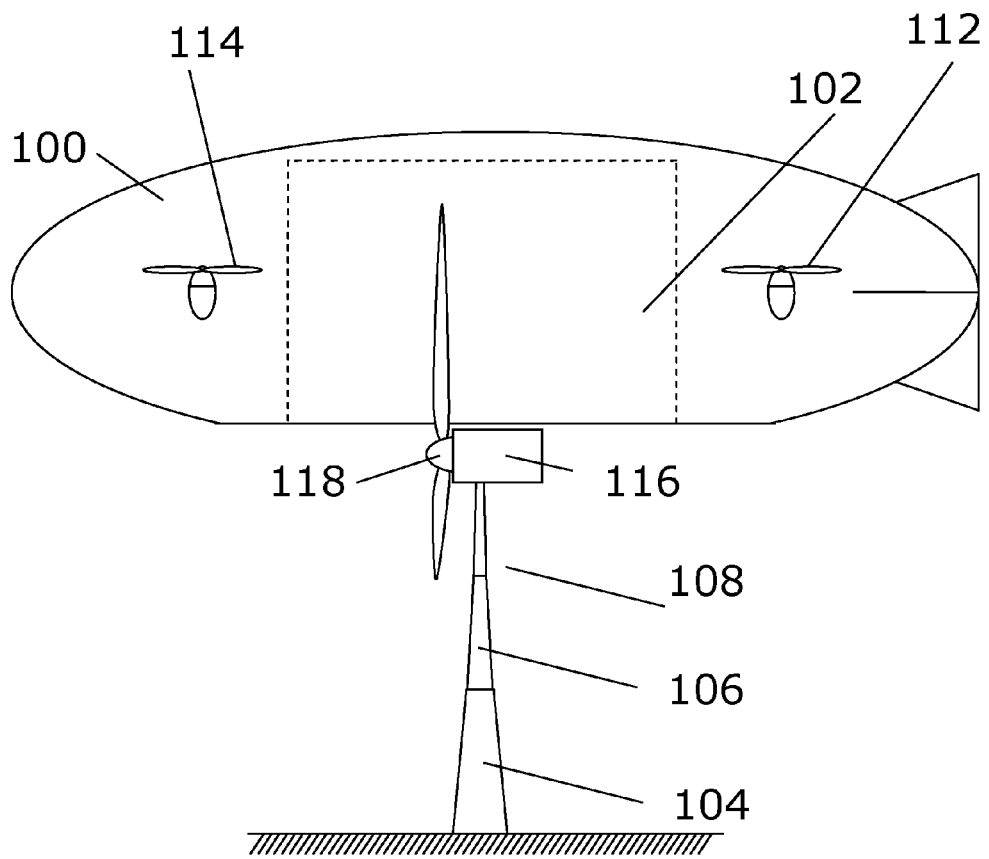
FIG. 4 schematically shows an airship docked at a wind turbine.

FIG. 4 shows the airship 100 anchored at a wind turbine. The airship is docked between two blades of the wind turbine in a position perpendicular to the rotational axis of the blades. The blades may stabilize the airship when anchored.

Figure 5:
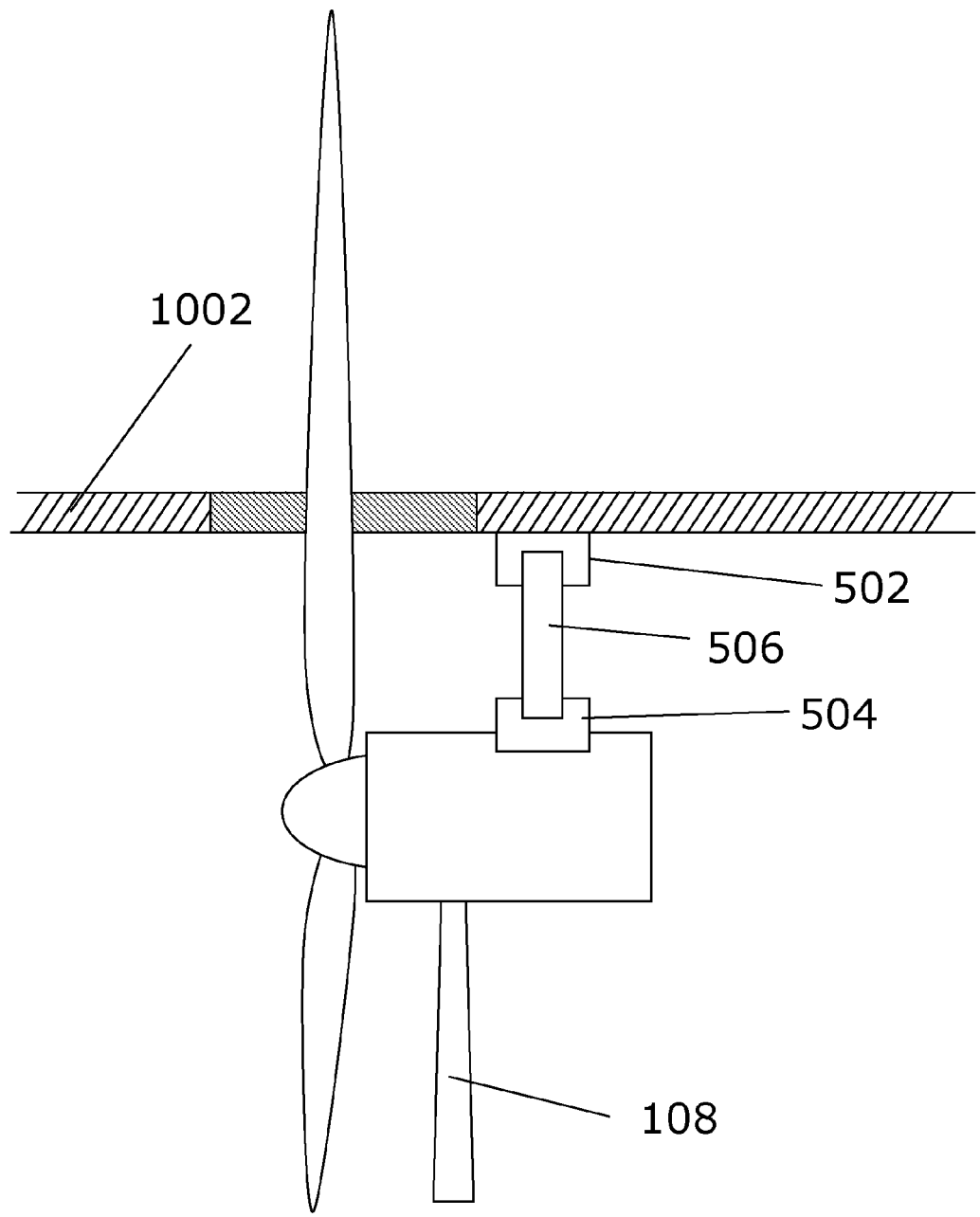
FIG. 5 schematically shows a connection between the nacelle of a wind turbine generator and an airship connected thereto via a connection mechanism.

FIG. 5 shows a lower part of an airship 100 connected to a wind turbine generator. The airship comprises an anchoring element 502, and the nacelle comprises a docking element 504. The anchoring and docking elements 502, 504 are mutually connected through a connection element 506. The connection element 506 may form part of the wind turbine generator or of the airship 100 before docking.

The connection element 506 may be a jetty, a ladder, a rope, a wire or similar element capable of anchoring the airship to the wind turbine generator. When the connection element 506 is a jetty, a ladder or similar element, the connection element 506 allows personal or equipment, such as repair equipment or wind turbine parts, to be easily transported to and from the airship. Also, in the embodiment shown, a working platform 1002 may be provided as part of the airship, such working platform making it safe and easy for personnel and equipment to enter and exit the nacelle.

Figure 6:
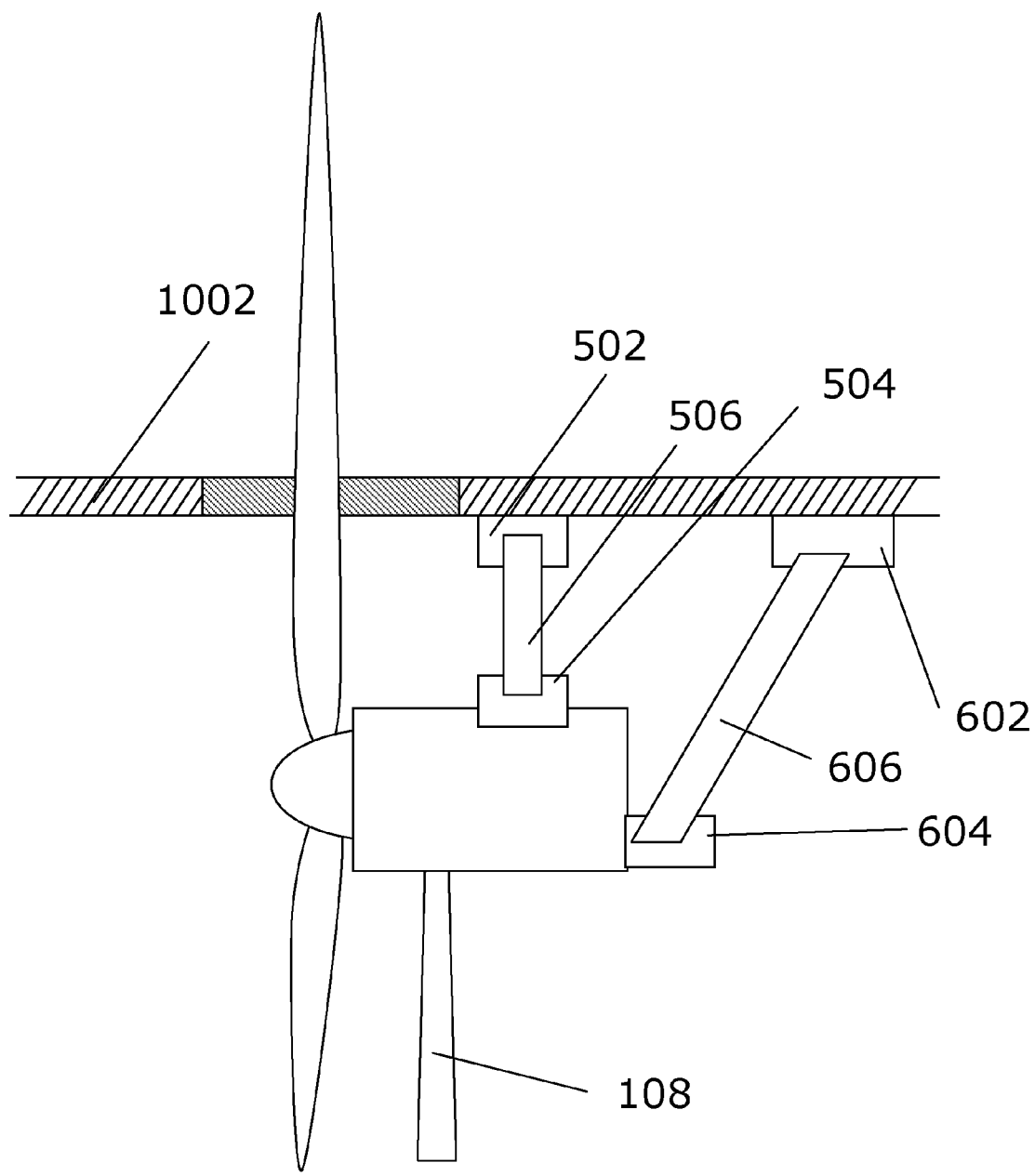
FIG. 6 schematically shows an alternative connection between an airship and a wind turbine generator, the connection comprising two anchoring points.

FIG. 6 shows part of an airship 100 connected to a wind turbine. The airship 100 comprises a first anchoring element 502 and a second anchoring element 602, and the nacelle comprises a first docking element 504 and a second docking element 604. The two first anchoring and docking elements 502, 504 are mutually connected through a first connection element 506. The two second anchoring and docking sections 602, 604 are mutually connected through a second connection element 606.

The connection elements 506, 606 may form part of the wind turbine or of the airship 100 before docking. One or both of the connection elements 506, 606 may be a jetty, ladder, a rope, a wire or similar element capable of anchoring the airship to the wind turbine generator. By having two anchoring points between the airship and the wind turbine generator a safer anchoring of the airship is provided.

Furthermore, one of the anchoring points may in this way be specialized for transporting personal or equipment such as repair equipment or wind turbine parts and the other anchoring point may be specialized for maintaining the airship 100 steady at the wind turbine generator. Also, in the embodiment shown, a working platform 1002 may be provided as part of the airship, such working platform making it safe and easy for personnel and equipment to enter and exit the nacelle.

Figure 7:
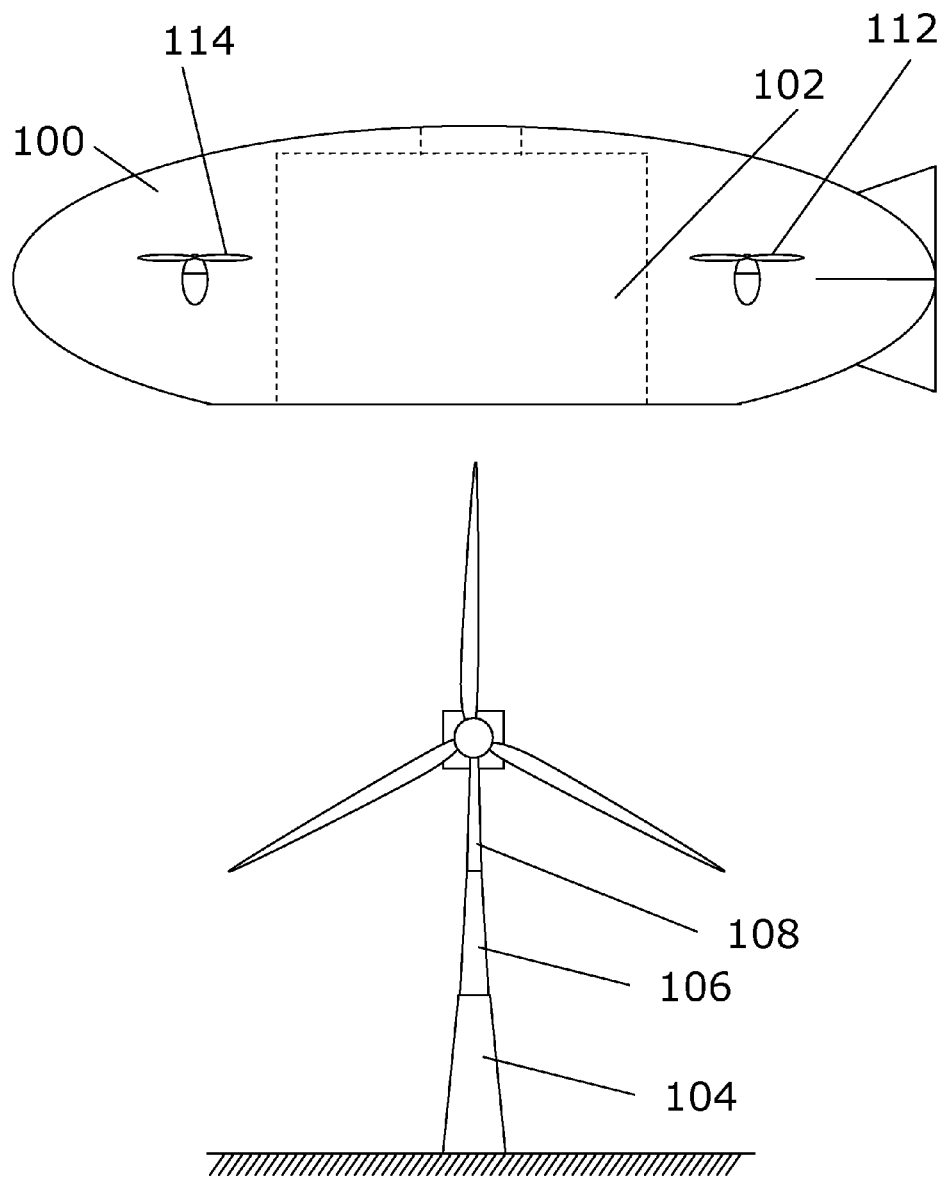
FIG. 7 schematically shows an airship flying above a wind turbine generator, the airship comprising a cavity with an aperture in the upper side.

FIG. 7 shows an airship 100 flying over a wind turbine. The airship comprises propellers 114, 112 and a cavity 102. The cavity is provided with an aperture at the top of the airship 100. The airship 100 is positioned in a direction parallel to the rotational axis of the blades, and because of the aperture at the top of the airship 100, the airship 100 is allowed docking without interfering with the blades, even if a blade extends upwards towards the airship 100.

Figure 8:
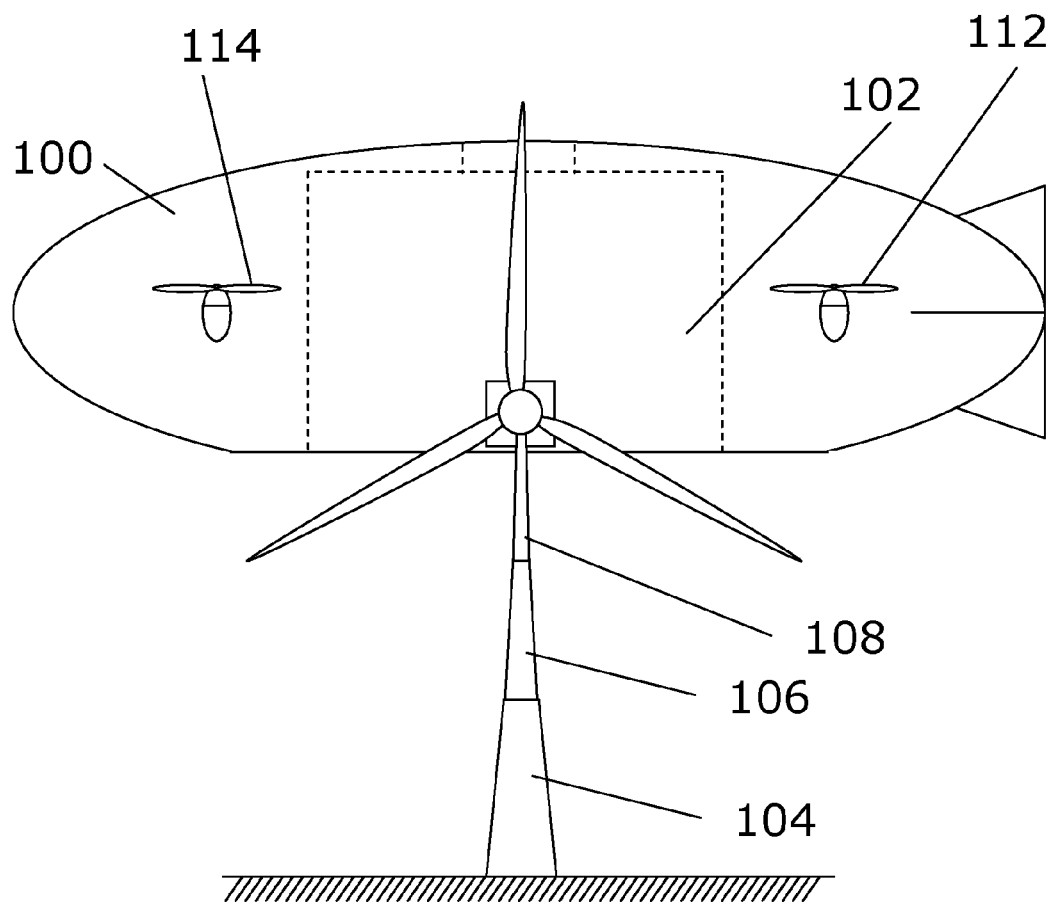
FIG. 8 shows the airship docked at the wind turbine generator of FIG. 7 with a blade extending through the cavity and the aperture.

FIG. 8 shows the airship 100 anchored at a wind turbine generator. The airship 100 is docked over the nacelle and the hub with one blade extending through the aperture at the top of the airship 100. A major axis of the airship 100 is substantially parallel to the plane of the blades of the wind turbine generator, and the airship may at least partly be maintained in position over the nacelle by means of the blade. By the airship 100 being positioned over the nacelle, service of the nacelle is easily performed, either from the side of the nacelle or from the top of the nacelle. Thus, cranes in the nacelle for accessing the ground from above, or cranes on the ground for accessing the nacelle from below, are not necessary.

Alternatively to the airship 100 being docked over the nacelle, the airship may be docked over the nacelle, but behind (i.e. to the rear of) the hub so that the blades extend outside the cavity of the airship. Still, a major axis of the airship 100 may be substantially parallel to the plane of the blades of the wind turbine generator. By being positioned over the nacelle, service of the nacelle is easily performed, either from the side of the nacelle or from the top of the nacelle. Thus, cranes in the nacelle for accessing the ground from above, or cranes on the ground for accessing the nacelle from below, are not necessary. However, by being positioned behind the hub, service which requires rotation of the hub, and thus of the blades, can be performed while the airship is anchored at the wind turbine generator.

Figure 9:
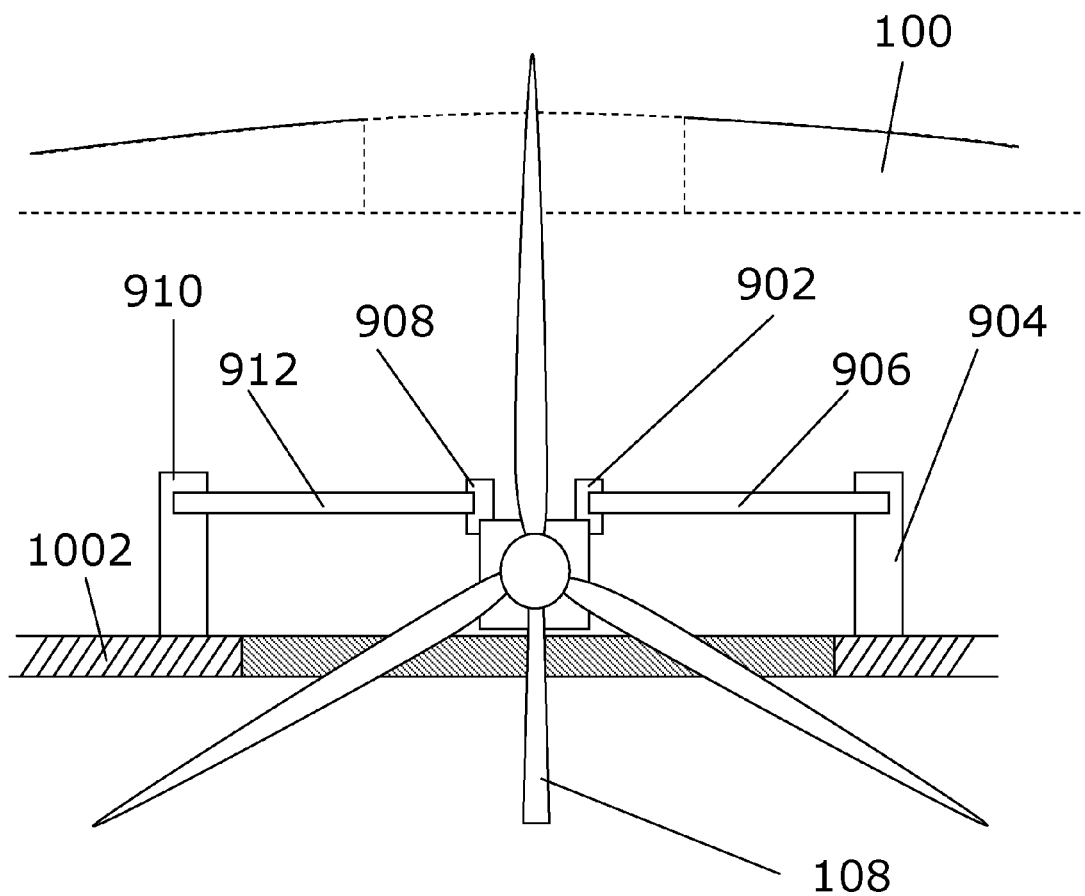
FIG. 9 schematically shows an alternative connection between a wind turbine generator and an airship.

FIG. 9 shows part of an airship 100 anchored to a wind turbine generator. The airship 100 is docked either with the upright blade extending through the aperture at the top of the airship, or alternatively, the airship is docked to the rear of the hub, both ways of docking being described above. The airship comprises a first anchoring element 904 and a second anchoring element 910, and the nacelle comprises a first docking element 902 and a second docking element 908. The two first anchoring and docking elements 904, 902 are mutually connected through a first connection element 906.

The two second anchoring and docking elements 910, 908 are mutually connected through a second connection element 912. The connection elements 906, 912 may form part of the wind turbine or of the airship before docking. The connection elements 906, 912 may be in the form of a jetty, a ladder, a rope, a wire or similar element capable of anchoring the airship to the wind turbine generator. By having two anchoring points between the airship and the wind turbine, a safer anchoring of the airship is provided. Furthermore, in the embodiment shown, both of the anchoring points may in this way be specialized for transporting personal or equipment such as repair equipment or wind turbine parts.

Also, in the embodiment shown, a working platform 1002 may be provided as part of the airship, such working platform making it safe and easy for personnel and equipment to enter and exit the nacelle. In the situation where the airship is positioned at the end of the nacelle rear to the hub, repair which requires rotation of the blades can be performed while the airship is anchored at the wind turbine.

In the embodiments shown, the airship 100 is docking at a nacelle of a wind turbine generator. In other situations, the airship may dock at other parts of the wind turbine generator such as at one or more of the blades, at the hub, at the tower or at a foundation, perhaps even docking using the airship for overnight accommodation of personnel and/or equipment, especially when servicing the wind turbine generator at sea.

Figure 10:
FIG. 10 shows a possible embodiment of an airship as shown schematically in the other figures; the airship is shown docked at the wind turbine generator.

Different specific designs of an airship as shown schematically in the figures mentioned above will be appreciated by a person skilled in the art. FIG. 10 shows an example of such a possible specific embodiment.

Although the present invention has been described in connection with the specified embodiments, it should not be construed as being in any way limited to the presented examples. The description has focused on docking the airship at a wind turbine generator during use, such as for service or maintenance. However, the method according to the invention can also be used in the last period of an installation of a wind turbine generator; e.g. for transporting components to the almost ready wind turbine generator or for transporting personnel from the finished wind turbine generator.

The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for servicing a wind turbine generator with an airship, the airship configured to achieve lift via a lifting gas that is lighter than the surrounding air and to navigate through the air under its own power, comprising:
   navigating the airship at a desired elevation achieved by the lifting gas and toward the wind turbine under the power of the airship,
   docking the airship at the wind turbine generator by connecting a forwards docking section, a rearwards docking section, a sideways docking section, or an upwards docking section of the airship to the wind turbine generator, and
   moving at least one wind turbine generator component or at least one person between the airship and the wind turbine generator.

2. The method according to claim 1, wherein docking the airship at the wind turbine generator further comprises connecting the airship to at least one of the following components of the wind turbine generator: a nacelle, a hub, a tower, one or more blades, a foundation, or a substation.

3. The method according to claim 1, wherein the wind turbine generator includes a nacelle, and wherein moving the at least one wind turbine generator component or the at least one person further comprises moving the at least one wind turbine generator component or the at least one person to or from a top of the nacelle.

4. The method according to claim 3, wherein the nacelle includes a fuselage with a hatch at the top of the nacelle, and wherein moving the at least one wind turbine generator component or the at least one person further comprises moving the at least one wind turbine generator component or the at least one person through the hatch at the top of the nacelle.

5. The method according to claim 1, wherein moving the at least one wind turbine generator component or the at least one person further comprises hoisting the at least one wind turbine generator component or the at least one person with a hoist of the airship from or to the wind turbine generator.

6. The method according to claim 5, wherein docking the airship at the wind turbine generator further includes connecting the hoist of the airship to the wind turbine generator.

7. The method according to claim 1, wherein moving the at least one wind turbine generator component or the at least one person further comprises hoisting the at least one wind turbine generator component or the at least one person with an on-board crane of the airship from or to the wind turbine generator.

8. The method according to claim 7, wherein docking the airship at the wind turbine generator further includes connecting the on-board crane of the airship to the wind turbine generator.

9. The method according to claim 1, wherein moving the at least one wind turbine generator component or the at least one person further comprises guiding the at least one wind turbine generator component or the at least one person with a jetty of the airship to or from the wind turbine generator.

10. The method according to claim 9, wherein docking the airship at the wind turbine generator further includes connecting the jetty to the wind turbine generator.

11. The method according to claim 1, wherein moving the at least one wind turbine generator component or the at least one person further comprises guiding the at least one wind turbine generator component or the at least one person along a ladder to or from the wind turbine generator.

12. The method according to claim 11, wherein docking the airship at the wind turbine generator further includes connecting the ladder to the wind turbine generator.

13. An airship for servicing a wind turbine generator including a docking element, comprising:
   an airship body including at least one propeller, the airship configured to achieve lift via a lifting gas that is lighter than the surrounding air and to navigate through the air under its own power; and
   a connection mechanism including an anchoring element coupled to the airship body and a connection element,
   wherein the anchoring element of said connection mechanism is configured to be connected to the docking element on the wind turbine generator by said connection element.

14. The airship according to claim 13, wherein said connection element includes a hoist on the airship body, said hoist being operable to hoist a wind turbine generator component or at least one person between the airship and the wind turbine generator.

15. The airship according to claim 13, wherein said connection element includes an on-board crane on the airship body, said crane being operable to move a wind turbine generator component or at least one person between the airship and the wind turbine generator.

16. The airship according to claim 13, wherein said connection element includes a jetty on the airship body, said jetty being operable to guide a wind turbine generator component or at least one person between the airship and the wind turbine generator.

17. The airship according to claim 13, wherein said connection element includes a ladder on the airship body, said ladder being operable to guide a wind turbine generator component or at least one person between the airship and the wind turbine generator.

18. The airship according to claim 13, wherein the wind turbine generator includes at least one wind turbine blade, and said airship body further includes a cavity extending through said airship body and sized to receive the at least one wind turbine blade when said anchoring element is connected to the docking element to dock the airship at the wind turbine generator.

19. The airship according to claim 13, further comprising:
   a working platform connected to said airship body and configured to protect at least one person moving between the airship and the wind turbine generator, wherein said anchoring element of said connection mechanism is directly coupled to said working platform.

* * * * *